United States Patent
Miller et al.

(10) Patent No.: US 9,891,335 B2
(45) Date of Patent: Feb. 13, 2018

(54) WIRELESS LOGGING OF FLUID FILLED BOREHOLES

(71) Applicant: SCHLUMBERGER TECHNOLOGY CORPORATION, Sugar Land, TX (US)

(72) Inventors: Douglas E. Miller, Boston, MA (US); Richard Timothy Coates, Katy, TX (US); Tarek M. Habashy, Burlington, MA (US); Francois M. Auzerais, Boston, MA (US); Phil F. Sullivan, Bellaire, TX (US); Dominique Guillot, Fontenay aux Roses (FR); Rod William Shampine, Houston, TX (US)

(73) Assignee: SCHLUMBERGER TECHNOLOGY CORPORATION, Cambridge, MA (US)

( * ) Notice: Subject to any disclaimer, the term of this patent is extended or adjusted under 35 U.S.C. 154(b) by 106 days.

(21) Appl. No.: 14/742,021

(22) Filed: Jun. 17, 2015

(65) Prior Publication Data
US 2015/0293252 A1 Oct. 15, 2015

Related U.S. Application Data

(62) Division of application No. 11/691,071, filed on Mar. 26, 2007, now Pat. No. 9,103,203.

(51) Int. Cl.
*E21B 47/06* (2012.01)
*G01V 1/48* (2006.01)
(Continued)

(52) U.S. Cl.
CPC ............ *G01V 1/52* (2013.01); *E21B 47/0005* (2013.01); *E21B 47/042* (2013.01); *E21B 47/06* (2013.01);
(Continued)

(58) Field of Classification Search
CPC .. E21B 47/0005; E21B 47/042; E21B 47/091; E21B 47/18; E21B 47/06; E21B 47/065; G01V 1/48; G01V 1/52
See application file for complete search history.

(56) References Cited

U.S. PATENT DOCUMENTS

| 602,422 | A | 4/1898 | Batcheller |
| 2,047,974 | A | 7/1936 | Lehr |

(Continued)

FOREIGN PATENT DOCUMENTS

| WO | 2312063 A | 10/1997 |
| WO | 0016128 A1 | 3/2000 |

(Continued)

OTHER PUBLICATIONS

Doublet, L.E., "Pressure Transient Data Acquisition and Analysis Using Real Time Electromagnetic Telemetry", SPE 35161, 1996, pp. 149-165.

(Continued)

*Primary Examiner* — John Fitzgerald

(57) ABSTRACT

A predetermined condition in a fluid-filled wellbore system can be detected by generating at least one sound in the wellbore system in response to the condition, such that a detectable change is created in some characteristic of the emitted sound, and detecting the at least one sound and the change, the detection being indicative that the predetermined condition has occurred. Equipment for facilitating detection of the condition can include a trigger operable in response to the condition; a generator operable to emit sound in the borehole and to create a detectable change in some characteristic of the emitted sound in response to the trigger; and at least one sensor operable to monitor the sound and detect the change, the detection being indicative that the predetermined condition has occurred. It is also possible to estimate a value of a property of a fluid-filled wellbore (Continued)

system. This can be accomplished by recording data including at least one of pressure and rate of flow at one or more locations in the wellbore system, and then estimating the value of the property by employing a model for predicting at least one of pressure and rate of flow dependent upon parameters detailing at least one of wellbore system geometry, viscoacoustic properties of the fluid and entrained solids contained in the wellbore system, locations of boundaries and entrained solids, and characteristics and locations of disturbances to pressure and flow in the wellbore system, in order to determine a best prediction of some attribute of the recorded data.

13 Claims, 11 Drawing Sheets

(51) Int. Cl.
  *G01V 1/52* (2006.01)
  *E21B 47/04* (2012.01)
  *E21B 47/09* (2012.01)
  *E21B 47/18* (2012.01)
  *E21B 47/00* (2012.01)

(52) U.S. Cl.
  CPC .......... *E21B 47/065* (2013.01); *E21B 47/091* (2013.01); *E21B 47/18* (2013.01); *G01V 1/48* (2013.01)

(56) References Cited

U.S. PATENT DOCUMENTS

| | | |
|---|---|---|
| 2,156,519 A | 5/1939 | Walker |
| 2,361,558 A | 10/1944 | James |
| 2,396,935 A | 3/1946 | Walstrom |
| 2,425,869 A | 8/1947 | Dillon |
| 2,999,557 A | 9/1961 | Smith et al. |
| 3,127,950 A | 4/1964 | Itria |
| 3,134,437 A | 5/1964 | Karpovich |
| 3,399,745 A | 9/1968 | Sparks |
| 3,475,722 A | 11/1969 | James |
| 3,483,505 A | 12/1969 | Wottlin et al. |
| 3,500,950 A | 3/1970 | Roever |
| 3,990,512 A | 11/1976 | Kuris |
| 4,168,483 A | 9/1979 | Parthasaraty et al. |
| 4,206,810 A | 6/1980 | Blackman |
| 4,300,654 A | 11/1981 | Raymond et al. |
| 4,575,830 A | 3/1986 | Ingram et al. |
| 4,703,460 A | 10/1987 | Kurkjian et al. |
| 4,793,178 A | 12/1988 | Ahern et al. |
| 4,805,726 A | 2/1989 | Taylor et al. |
| 4,811,814 A | 3/1989 | Staron et al. |
| 4,858,718 A | 8/1989 | Chelminski |
| 4,872,526 A | 10/1989 | Wignall et al. |
| 5,109,698 A | 5/1992 | Owen |
| 5,109,947 A | 5/1992 | Rector, III |
| 5,136,549 A | 8/1992 | Berglund |
| 5,170,018 A | 12/1992 | Potier |
| 5,331,604 A | 7/1994 | Chang et al. |
| 5,537,364 A | 7/1996 | Howlett et al. |
| H1663 H | 7/1997 | Yen |
| 5,831,934 A | 11/1998 | Gill et al. |
| 6,196,350 B1 | 3/2001 | Minto |
| 6,352,109 B1 | 3/2002 | Buckman |
| 6,397,950 B1 | 6/2002 | Streich et al. |
| 6,456,566 B1 | 9/2002 | Aronstam |
| 6,856,912 B2 | 2/2005 | Fehmers et al. |
| 7,134,492 B2 | 11/2006 | Wilberg et al. |
| 7,874,362 B2 | 1/2011 | Coates et al. |
| 9,103,203 B2 * | 8/2015 | Miller .................. E21B 47/042 |
| 2004/0140092 A1 | 7/2004 | Robison |
| 2004/0226715 A1 | 11/2004 | Wilberg |
| 2005/0284625 A1 | 12/2005 | Rodney et al. |
| 2008/0110691 A1 | 5/2008 | Chang et al. |
| 2008/0239872 A1 | 10/2008 | Miller et al. |
| 2009/0159272 A1 | 6/2009 | Auzerais et al. |

FOREIGN PATENT DOCUMENTS

| | | |
|---|---|---|
| WO | 0054009 A | 9/2000 |
| WO | 2004074633 A | 9/2004 |
| WO | 2006000742 A | 1/2006 |

OTHER PUBLICATIONS

Fisher et al., Real-Time Bottomhole Data Can Improve Accuracy of Fracture Diagnostics, GRI GasTips, 1996/1997, vol. 3, pp. 20-25.
Ghiotto et al., Investigating the Acoustic Properties of the Underwater Implosions of Light Globes and Evacuated Spheres, Australian Acoustical Society Conference, Nov. 15-17, 2000, pp. 223-231.
Heard et al., Underwater Light Bulb Implosions: A Useful Acoustic Source, Proc IEEE Oceans, 1997, pp. 755-762.
Marzetta et al., One-dimensional implosions under gravity-induced hydrostatic pressure, J. Acoust. Soc. Am., vol. 82, No. 6, Dec. 1987, pp. 2090-2101.
Orr et al., Acoustic signatures from deep water implosions of spherical cavities, J. Acoust. Soc. Am., vol. 59, May 1976, pp. 1155-1159.
Harben et al., Use of Imploding Spheres: an Alternative to Explosives as Acoustic Sources at Mid-Latitude SOFAR Channel Depths, Lawrence Livermore National Laboratory Report, UCRL-ID-139032, May 2000, pp. 1-10.
Economides et al., Reservoir Stimulation, John Wiley & Sons, Ltd., 2000, Chapter 9.
Urick, Implosions as Sources of Underwater Sound, J. Acoustic Soc. Am., Oct. 14, 1963, vol. 35, pp. 2026-2027.
White, Underground Sound: Application of Seismic Waves, Elsevier, ISBN 0-444-42139-4, 1983, pp. 139-188.
Patent Cooperation Treaty, International Search Report, dated Mar. 13, 2009, 6 Pages.

* cited by examiner

WIRELESS LOGGING OF FLUID FILLED BOREHOLES

CROSS-REFERENCE TO RELATED APPLICATIONS

This patent application is a divisional application of U.S. patent application Ser. No. 11/691,071, filed Mar. 26, 2007. The subject matter of this patent application is also related to U.S. patent application Ser. No. 11/691,117, filed Mar. 26, 2007 and issued as U.S. Pat. No. 7,874,362. Each of these patent applications is hereby incorporated herein by reference in its entirety.

FIELD OF THE INVENTION

This invention is generally related to oil and gas wells, and more particularly to wireless logging of fluid filled boreholes.

BACKGROUND OF THE INVENTION

Achieving accurate, real-time measurements during well completion and stimulation treatments has long been a goal in the oil and gas industry. Accurate measurement of bottom hole pressure during fracture treatments, for example, would allow an operator to observe fracture growth trends in real-time, and change treatment conditions accordingly. Similarly, measurement of ball location would facilitate acid ballout treatments. However, real-time measurements of borehole completion and stimulation treatments are rarely performed with current technology because the borehole environment is hostile to wiring and tends to rapidly attenuate electromagnetic signals. For example, the abrasiveness of the fracturing slurry is destructive to any exposed cable placed in the wellbore for delivering data to the surface.

Techniques for providing real-time measurements during drilling operations are known. For example, formation properties may be measured during the excavation of the borehole, or shortly thereafter, through the use of tools integrated into the bottomhole assembly ("BHA"). Logging while drilling has the advantage of measuring properties of a formation before drilling fluids invade deeply. However, many wellbores prove to be difficult or even impossible to measure with conventional wireline tools, especially highly deviated wells. Consequently, when drilling operations have ended and the BHA is withdrawn from the borehole, e.g., in the completion phase or during stimulation treatments, it is often impractical to obtain real-time measurements.

One attempt to deliver bottom hole pressure measurement data in real-time is described in Doublet, L. E., Nevans, J. W., Fisher, M. K., Heine, R. L, Blasingame, T. A., *Pressure Transient Data Acquisition and Analysis Using Real Time Electromagnetic Telemetry*, SPE 35161, March 1996 ("Doublet"). Doublet teaches that pressure measurements are transmitted from a downhole gauge to the surface through the formation strata via electromagnetic signals. Although this technique has been used successfully on some wells, it is limited by the well depth and the types of rock layers through which a signal could be transmitted clearly. In particular, electromagnetic signals are rapidly attenuated by the formation. These limitations render the technique impractical for use in many wells, and particularly in deep wells.

Gathering data from the region of a formation between boreholes is also known. Typically, a seismic source in one borehole creates waves which are detected in another borehole. Formation properties may be calculated from attenuation, dispersion and travel time of the waves between the boreholes. An implosive device might be utilized as the seismic source. For example, imploding spheres and other shapes have been used as underwater acoustic sources for ocean applications as described in Heard, G. J., McDonald, M., Chapman, N. R., Jashke, L., "Underwater light bulb implosions—a useful acoustic source," Proc IEEE Oceans '97; M. Orr and M. Schoenberg, "Acoustic signatures from deep water implosions of spherical cavities," J. Acoustic Society Am., 59, 1155-1159, 1976; R. J. Urick, "Implosions as Sources of Underwater Sound," J. Acoustic Society Am, 35, 2026-2027, 1963; and Giotto, A., and Penrose, J. D., "Investigating the acoustic properties of the underwater implosions of light globes and evacuated spheres," Australian Acoustical Society Conference, Nov. 15-17, 2000. A device with a vacuum or low pressure chamber which is released into the water to sink will eventually implode when the hydrostatic pressure exceeds the implosion threshold of the device. A triggering mechanism may even be used to cause the device to implode before pressure alone would do so as described in Harben, P. E., Boro, C., Dorman, Pulli, J., 2000, "Use of imploding spheres: an Alternative to Explosives as Acoustic Sources at mid-Latitude SOFAR Channel Depths," *Lawrence Livermore National Laboratory Report*, UCRL-ID-139032. One example of an implosive device is commercial light bulbs, as described in both Heard, G. J., McDonald, M., Chapman, N. R., Jashke, L., "Underwater light bulb implosions—a useful acoustic source," Proc IEEE Oceans '97; and Giotto. The controlled use of implosive sources in a wellbore is described in U.S. Pat. No. 4,805,726 of Taylor, D. T., Brooks, J. E., titled "Controlled Implosive Downhole Seismic Source."

SUMMARY OF THE INVENTION

In accordance with one embodiment of the invention, a method is provided for estimating a value of a property of a fluid-filled wellbore system. One step of the method is recording data including at least one of pressure and rate of flow at one or more locations in the wellbore system. The value of the property can then be estimated by employing a model for predicting at least one of pressure and rate of flow dependent upon parameters detailing at least one of wellbore system geometry, viscoacoustic properties of the fluid and entrained solids contained in the wellbore system, locations of boundaries and entrained solids, and characteristics and locations of disturbances to pressure and flow in the wellbore system, in order to determine a best prediction of some attribute of the recorded data. Implemented as an apparatus, this embodiment includes at least one sensor operable to record the data at one or more locations in the wellbore system; a model for predicting at least one of pressure and rate of flow dependent upon parameters detailing at least one of wellbore system geometry, viscoacoustic properties of the fluid and entrained solids contained in the wellbore system, locations of boundaries and entrained solids, and characteristics and locations of disturbances to pressure and flow in the wellbore system, in order to determine a best prediction of some attribute of the recorded data; and an analyzer operable to estimate the value of the property from the model.

In accordance with another embodiment of the invention, a method is provided for detecting a predetermined condition in a fluid-filled wellbore system. One step of the method is generating at least one sound in the wellbore system in response to the condition, such that a detectable change is created in some characteristic of the emitted sound. Another step is detecting the at least one sound and the change, the detection being indicative that the predetermined condition has occurred. When implemented as an apparatus the embodiment includes a trigger operable in response to the condition; a generator operable to emit sound in the borehole and to create a detectable change in some characteristic of the emitted sound in response to the trigger; and at least one sensor operable to monitor the sound and detect the change, the detection being indicative that the predetermined condition has occurred.

In accordance with another embodiment of the invention, information can be communicated in real time across distances that permit practical application of the invention. This is possible because acoustic disturbances propagate more efficiently than electromagnetic signals in a wellbore system. Further, because the acoustic disturbances are wireless, the invention is less susceptible to damage from the abrasiveness of the fracturing slurry in comparison with exposed cables placed in the wellbore for delivering data to the surface.

Further features and advantages of the invention will become more readily apparent from the following detailed description when taken in conjunction with the accompanying drawings.

DETAILED DESCRIPTION

Figure 1:
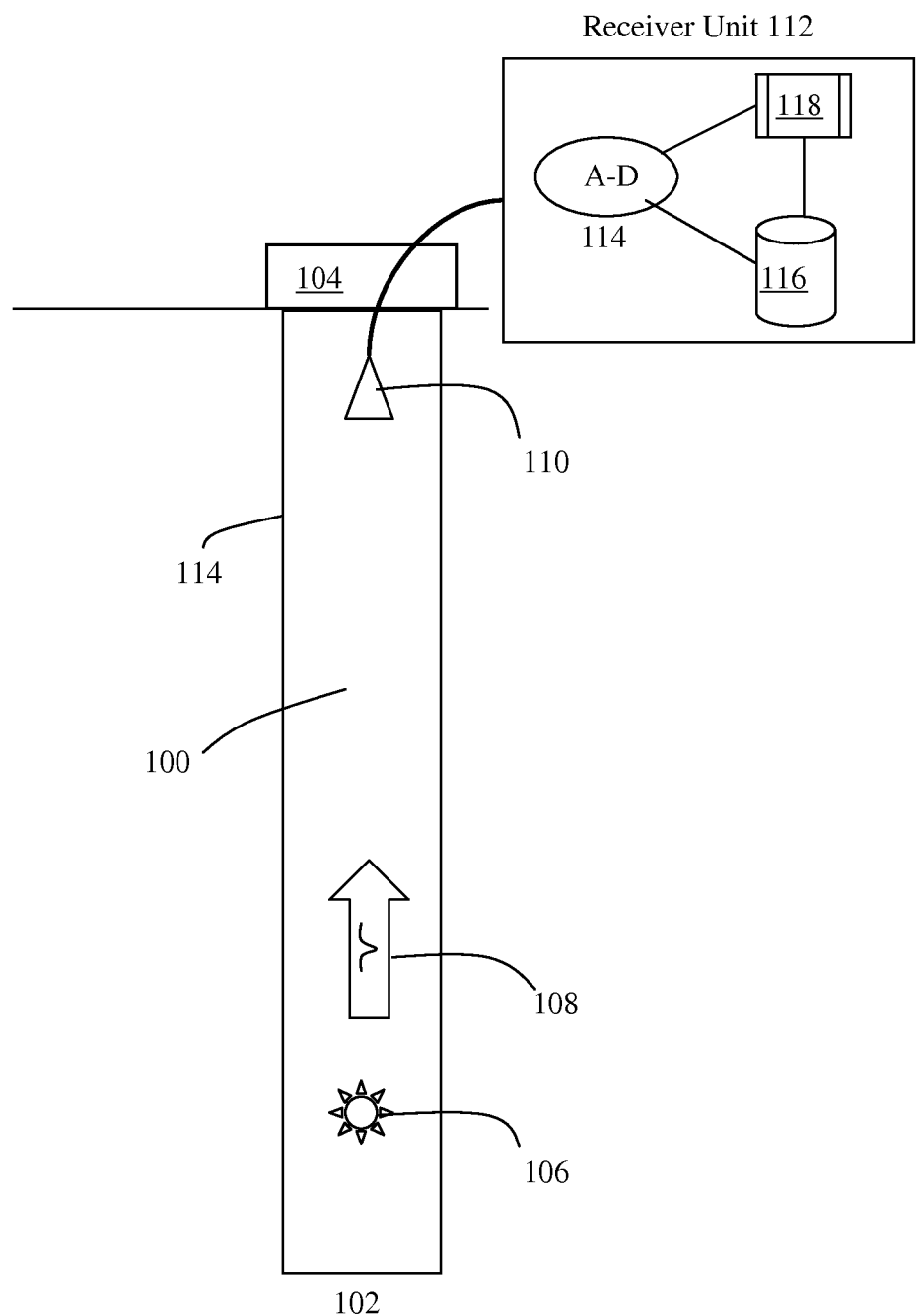
FIG. 1 is a schematic illustrating wireless downhole to surface communication in a borehole system.

FIG. 1 illustrates a borehole system which includes a fluid-filled borehole (100) having a bottom (102) and a head (104). The head is typically at the surface, and although the borehole is illustrated as being perpendicular to the surface and linear from head to bottom, the borehole may be at any angle and have changes of direction.

A downhole device (106) is operable to communicate wirelessly via acoustic disturbances (108) in the fluid. The location of the downhole device (106) may be both fixed and known if that is necessary for the communication to have practical use. Alternatively, when location is not critical to the utility of the communicated information, the downhole device may be either or both mobile and at an unknown location.

A receiver unit located near the head of the borehole is operable to receive and interpret the acoustic disturbances generated by the downhole device. The receiver includes at least one sensor (110) and a processor unit (112). The sensor may include any number of individual sensors, e.g., an array of hydrophones. The sensor is disposed in position to detect acoustic disturbances generated within the borehole fluid. For example, the sensor could be disposed near the head (104), as illustrated, or closer to the bottom (102). Further, the sensor may be either fixed, e.g., to the casing (114), or mobile, e.g., connected to coiled tubing. The processor unit (112) includes a hydrophone digitizer (114), memory (116) and analyzer (118), which are operative in response to detected acoustic disturbances (108) to provide useful information such as measurements of properties or an indication of a condition within the borehole.

The acoustic disturbances (108) used to communicate information via the borehole fluid can take any of various forms. For example, the acoustic disturbances could include a continuous wave, or one or more discreet pulses created by changing pressure or flow of the fluid (since pressure and flow are interrelated in the borehole system, changing one necessarily changes the other). In terms of frequency, the acoustic disturbance will typically be in the range from DC to 40 kHz, with perhaps the most useful frequencies being in the range from 0.1 Hz to 2 kHz. The pressure/flow change may be generated by an implosion, explosion, piezoelectric force, interruption of a pump or valve, or other means. As will be discussed in greater detail below, the acoustic disturbances (108) may also be shaped or otherwise generated in a manner that permits communication of more complex information, as well as distinguishing different communications from one another.

In perhaps the most basic embodiment, the acoustic disturbance (108) is used to communicate the occurrence of a condition. In particular, the acoustic disturbance is generated by the downhole device (106) to communicate from a location of interest to the receiver unit in response to some triggering condition, i.e., to communicate that the condition has occurred. Examples of triggering conditions include, but are not limited to, a predetermined level of pressure, pH, temperature, background radiation, location, velocity, state of cure of entrained cement, period of time, and any combinations thereof. So, for example, an acoustic pulse could be used to indicate that a cement slug had cured sufficiently to permit a subsequent stage of completion operations. In such an embodiment the receiver unit need only distinguish the pulse from ambient noise, i.e., the pulse itself does not contain any additional information other than that the condition has occurred. Filters in the analyzer may be utilized to facilitate distinguishing the acoustic disturbance from other sources such as a pump used to move the fluid in the borehole.

Figure 2:
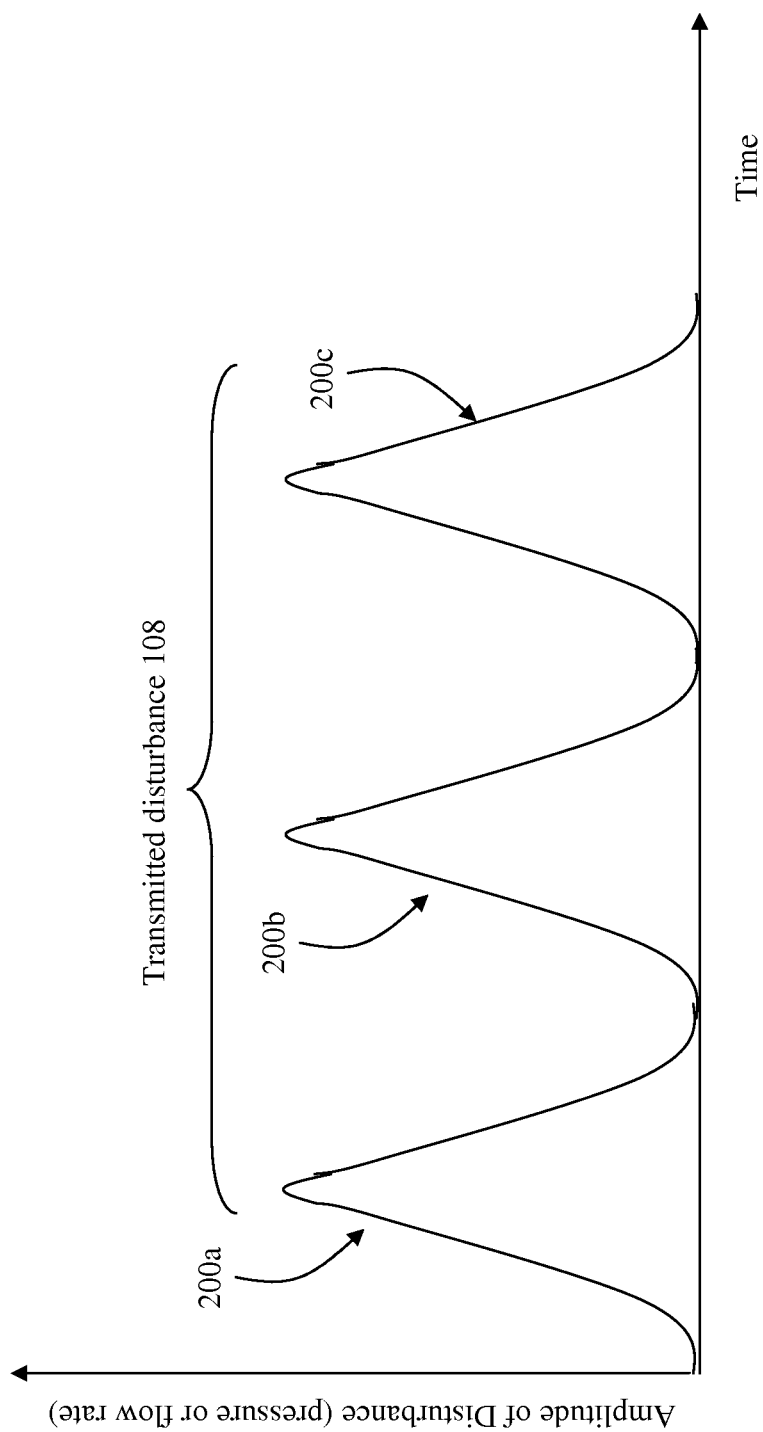
FIG. 2 is a graph illustrating transmitted pulses where amplitude and frequency may be utilized to communicate information in the borehole system.
Figure 3:
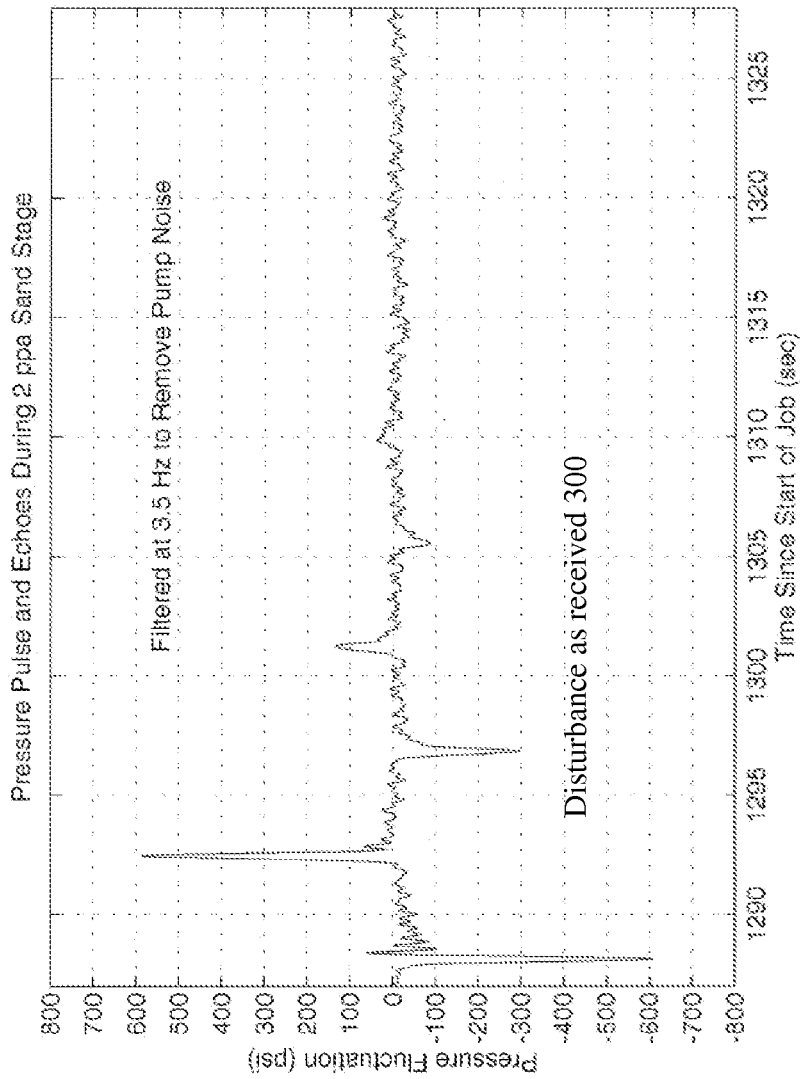
FIG. 3 is a graph illustrating a tubewave associated with a pulse of FIG. 2.

Referring now to FIGS. 1 through 3, in a first alternative embodiment the downhole device (106) generates an acoustic disturbance (108) that is indicative of a value of a property. For example, a series of pulses (200a, 200b, 200c), or at least one shaped pulse, can be used to indicate a value measured or detected by a sensor associated with the downhole device (106). Properties for which values may be measured or detected include, but are not limited to, pressure, pH, temperature, background radiation, location, velocity, state of cure of entrained cement, period of time, and any combinations thereof. Acoustic pulses may be shaped in terms of amplitude and frequency in order to represent measured or detected values, e.g., a temperature of 100 degrees C. For example, the amplitude or frequency of the disturbance could be proportional to the temperature measured by the downhole device. Alternatively, a series of acoustic pulses might be used to represent the values in a manner such as that typically utilized for digital communications. Therefore, in an ideal system, any of various measured or detected values can be communicated to the surface with resolution defined at least in part by the range of amplitude.

In practice, however, it will typically be desirable to have the capability of processing the disturbance as measured by the sensor (110), which will differ from the transmitted disturbance (108) due to the effects of the wellbore system. FIG. 3 illustrates a received disturbance (300) which is a tubewave resulting from a single transmitted pressure pulse (200a, FIG. 2). The tubewave is characterized by reflections of alternating polarity which decrease in amplitude over time. In the case where a series of pulses are being transmitted, whether or not amplitude and frequency convey information, it is useful for the receiver unit (112) to process the received disturbance to filter noise, distinguish the initial pulse from reflections of earlier pulses, and otherwise account for changes in the transmitted disturbance. More particularly, the receiver unit is operable to account for various parameters of the borehole system which can cause changes in the acoustic disturbance between the downhole source and the receiver unit including but not limited to wellbore system geometry, viscoacoustic properties of the fluid and entrained solids contained in the wellbore system, locations of boundaries and entrained solids, and characteristics and locations of disturbances may alter the acoustic disturbance in transit. The receiver unit may accomplish this by utilizing a model of one or more of these parameters. The model, which may be stored in the memory (116), is utilized to interpret the acoustic disturbance as received by the sensor (110), in order to determine a best prediction of some attribute of the recorded data, where the attribute includes at least one of amplitude, frequency, attenuation, dispersion and travel time. The model may yield useful information such as the actual value of a property.

The model may include both general parameters and borehole-specific parameters. For example, a generic model could include parameters for a typical borehole system. Further, multiple generic models might be provided for conditions typically found in particular types of wells and particular stages of well development and operation. Generic models could also be provided for particular stimulation treatments. Further, borehole specific models could be generated, either independently or by modifying a generic model, in order to adapt the sensor unit to the conditions of the borehole under observation.

Some specific applications of the illustrated embodiment include, but are not limited to, disturbance generation sources on screens, packers, and casing collars. For example, a disturbance source could be secured to a casing float collar to indicate hydrostatic pressure measurement during cement set. Another specific application is sources run while logging during completion of well. For example, a source could be set while logging to trigger when a perf gun reaches a desired location.

Figure 4:
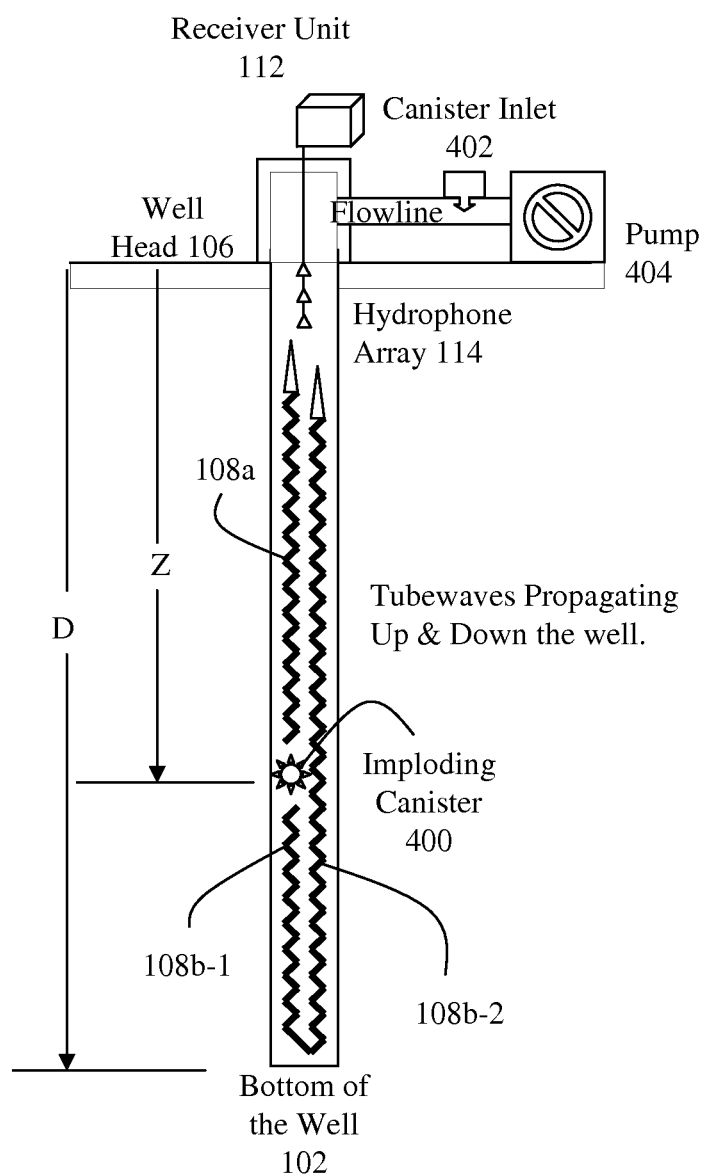
FIG. 4 is a schematic illustrating use of direct and reflected tubewaves to calculate location of a device in the borehole system.

FIG. 4 illustrates use of a mobile downhole device (400) at an unknown location, where location is calculated from comparison of direct and reflected acoustic disturbances. The mobile downhole device (400) is introduced into the fluid being pumped into the borehole via an inlet (402) between the pump (404) and the head (104). The downhole device (400) is designed to generate an acoustic disturbance when a particular condition is encountered, e.g., by imploding when the pressure exceeds a predetermined implosion value. Once introduced into the fluid, the downhole device is carried down the borehole by at least one of (a) the fluid being pumped and (b) the force of gravity. In the case of a pressure-sensitive device (400), when the pressure to which the downhole device is subjected exceeds the implosion value, the acoustic disturbance is generated. The acoustic disturbance generates strong tubewaves (108a, 108b-1) which travel both up and down the borehole, i.e., an up-going tubewave (108a) and a down-going tube wave (108b-1). The up-going tubewave (108a) propagates upward through the borehole to the head (104). The down-going tubewave (108b-1) propagates downward and is strongly reflected by the bottom of the borehole (102). The reflected, down-going tubewave (108b-2) then propagates upward to the head. The direct up-going and reflected down-going tubewaves are both detected by the sensor (110) at or near the borehole head. A clock circuit of the processor unit is employed to measure the difference in time between detection of the tubewaves (108a, 108b-2). The depth at which the acoustic disturbance occurred is then calculated by the processor unit (112) from the time-lag between the direct up-going tubewave (108a) and the reflected down-going tubewave (108b-2), yielding a depth D-Z (measured along the length of the borehole from the bottom of the well (102)) at which the pressure exceeds the implosion value. Since the implosion value of pressure for the downhole device is known, the result is a data point indicative of actual pressure at the depth Z.

It should be noted that the down-going tubewave (108b-1) may be reflected before reaching the bottom of the borehole (102). For example, a major change in borehole impedance may cause reflection of the down-going tubewave. In some cases it may be necessary to distinguish that reflection from a reflection at the bottom of the borehole. In other cases where the depth of the feature is known, the tubewave reflected by the feature may be employed in the depth calculation. Other signals generated by the acoustic disturbance such as extensional or flexural waves in the casing might also be detected at the surface. If they are present and have known propagation speed then they may be used as an additional or alternative method for determining the depth of the acoustic disturbance. Still other noise, such as that generated by the pump (404), may need to be removed by filtering.

Other signals generated by the implosion such as extensional or flexural waves in the casing might also be detected at the surface. If they are present and have known propagation speed then they may be used as an additional or alternative method for determining the depth of the implosion. Still other signals, such as those generated by a pump, may need to be removed by filtering.

Various techniques may be employed to calculate acoustic disturbance depth from the delta of tubewave arrival times. For example, the propagation speed, V, of the tubewave in a fluid-filled cased borehole is described by White (1983) as:

$$V=[\rho(1/B+1/(\mu+(Eh/2b)))]^{-1/2},$$

where $\rho$ is fluid density, B is the bulk modulus of the fluid, $\mu$ is the shear modulus of the rock, E is Young's modulus for the casing material, h is the casing thickness and b is the casing outer diameter. For a water-filled borehole, an acceptable approximation of V is 1450 m/s. For drilling mud this velocity may vary slightly due to increases in the density, ρ, or changes in the bulk modulus, B. Either density or bulk modulus can be measured for a particular fluid under consideration, and modifications made to the value of V if necessary.

Various techniques may be employed for calibrating the tubewave speed. For example, multiples show the total roundtrip period. Further, autocorrelation of pump noise shows the total roundtrip period. Still further, a source at the surface can determine total roundtrip period.

In the embodiment illustrated in FIG. 3, acoustic disturbance depth is calculated for a borehole of known total depth, D, and an acoustic disturbance at an unknown depth, Z, occurring at unknown time, $T_0$. The up-going tubewave (108a) is detected at the sensor (110) at the top of the borehole at time $T_1$. Since the time of the acoustic disturbance $T_0$ and the depth, Z, are unknown, the result cannot be calculated from $T_1$ alone. However, if the arrival time of the tubewave (108b-2) reflected from the bottom of the borehole, $T_2$, is recorded then two equations for two unknowns are available:

$$T_1 - T_0 = Z/V$$

and $$T_2 - T_0 = (2D - Z)/V.$$

The unknown origin time can then be eliminated from these two equations to obtain an expression for the depth of the acoustic disturbance:

$$Z = D - V(T_2 - T_1)/2.$$

There are a variety of techniques to detect tubewave arrival times and arrival delays, including manual picking, automatic thresholding algorithms, and autocorrelation based approaches. More sophisticated approaches may be required if the typical noise field is more complex, or if multiple canisters designed to implode at varying pressures are deployed simultaneously. As already described above, modeling may be employed to interpret the acoustic disturbance as received by the sensor, i.e., in order to determine a best prediction of some attribute of the recorded data, where the attribute includes at least one of amplitude, frequency, attenuation, dispersion and travel time.

Figure 5:
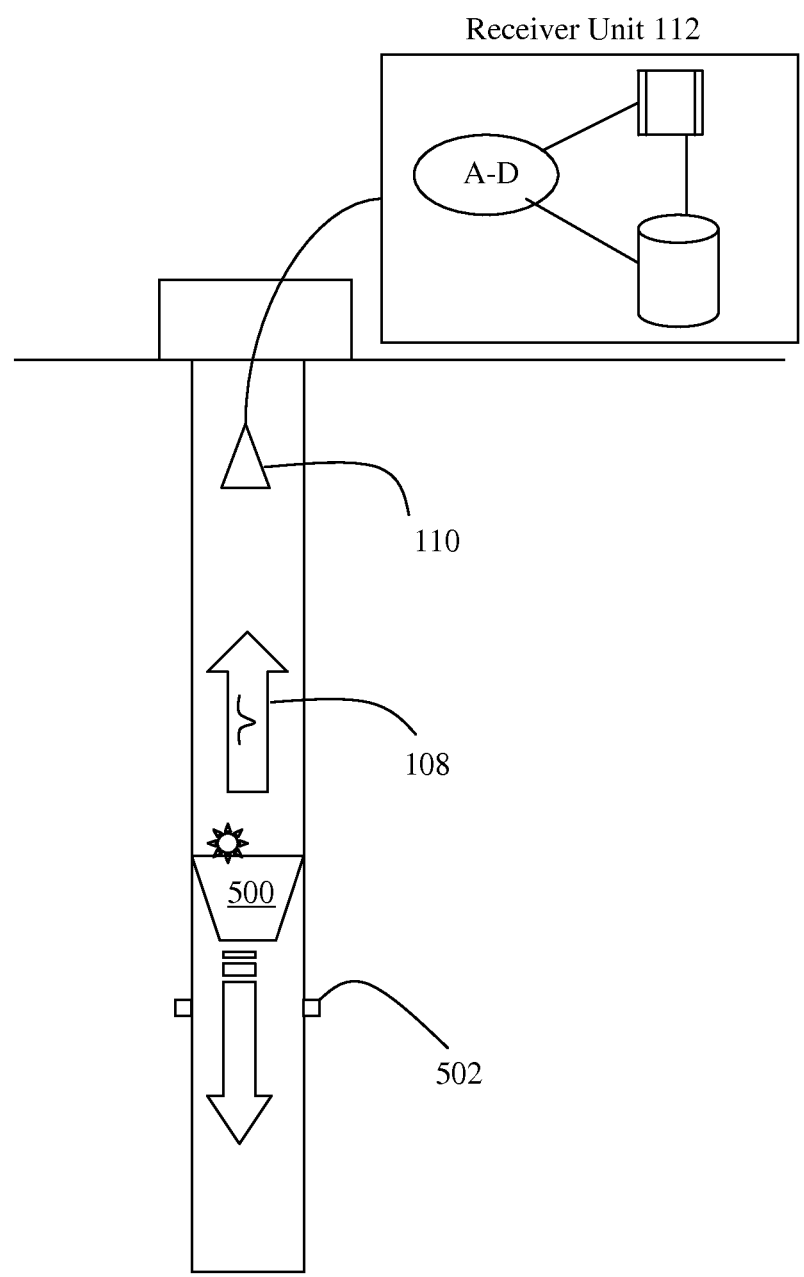
FIG. 5 is a schematic illustrating use of acoustic disturbances by a device in motion in the borehole system to communicate a value of a property or occurrence of a condition.

FIG. 5 illustrates use of acoustic disturbances (108) by a device (500) in motion in the borehole. Unlike the previously described embodiment, only a direct tubewave is employed to communicate information. The device (500) can be configured to utilize acoustic disturbances to communicate occurrence of a condition and values of properties to the surface in the manner already described above. Further, the device could communicate location by, for example, generating an acoustic disturbance at each collar (502). The receiver unit (112) could then calculate position by multiplying the number of collar transits by the distance between collars. Specific applications include, but are not limited to, cement wiper plugs that pulse or siren, pulsing BHA's, a pulse emitter on coiled tubing, analogues to wiper plugs for fracturing and acidizing, noisy spacer fluids to detect progress of fluids in the borehole, and a repeater pulse with an accurate clock.

Because the downhole device (500) is in motion, the receiver unit may obtain information about the location and velocity of the downhole device from the Doppler effect on the acoustic disturbances. In particular, a frequency shift is induced in the acoustic disturbance (108) as a function of velocity and direction relative to the sensor. Since the borehole system may also have an effect on the acoustic disturbances, modeling may be utilized, as already described above, to facilitate interpretation of the received acoustic disturbances.

Figure 6:
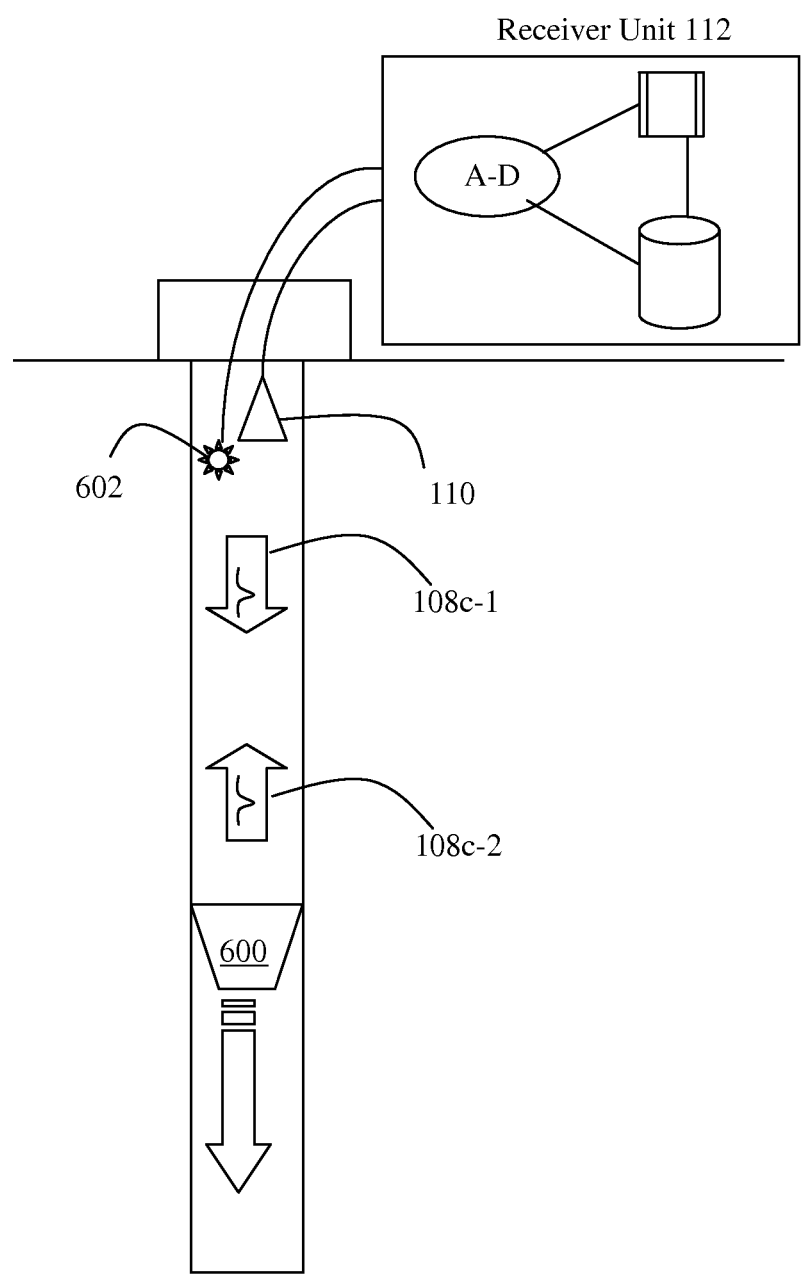
FIG. 6 is a schematic illustrating use of reflected acoustic disturbances to obtain information from an object in motion in the borehole.

FIG. 6 illustrates locating downhole objects with time lapse response and interferometry. In a simple scenario where the object (600) is stationary, an acoustic disturbance (108c-1) is initiated by a source (602) at a remote location at a known time, as measured by a clock circuit. The remote location is depicted as being proximate to the borehole head, but any location apart from the downhole object would be considered a remote location. The acoustic disturbance (108c-1) propagates through the borehole and is reflected by the downhole object (600). The reflected disturbance (108c-2) is then detected by the sensor (110) associated with the processor unit at a known time as measured by the clock circuit. The location of the downhole object can then be calculated from the round trip propagation time of the acoustic disturbance, i.e., 108c-1 and 108c-2. Since propagation time can be effected by the borehole environment, the modeling technique already described may be utilized to facilitate interpretation of the received disturbance. Some specific applications of this embodiment include, but are not limited to, locating cement wiper plugs, locating cement slugs, sand plugs, and packers, locating perforations and fractures, locating obstructions in pipelines, locating gas bubbles, monitoring frac extension, monitoring an acid ballout, evaluating filter cake integrity, and optimizing coiled tubing (CT) cleanout.

The downhole object may include a reflector configured to modulate the disturbance in order to communicate information to the sensor unit. For example, the frequency and amplitude of the disturbance could be modulated in order to communicate the value of a property. Modeling may be required in order to distinguish the effects of modulation of the disturbance by the downhole device from effects induced by the borehole system.

In the case where the object is in motion, the receiver unit may obtain information about the location and velocity of the downhole device from the Doppler effect on the acoustic disturbances. In particular, a frequency shift is induced in the acoustic disturbance as a function of velocity and direction relative to the sensor. Since the borehole system may also have an effect on the acoustic disturbances, modeling may be utilized, as already described above, to facilitate interpretation of the received acoustic disturbances.

Figure 7:
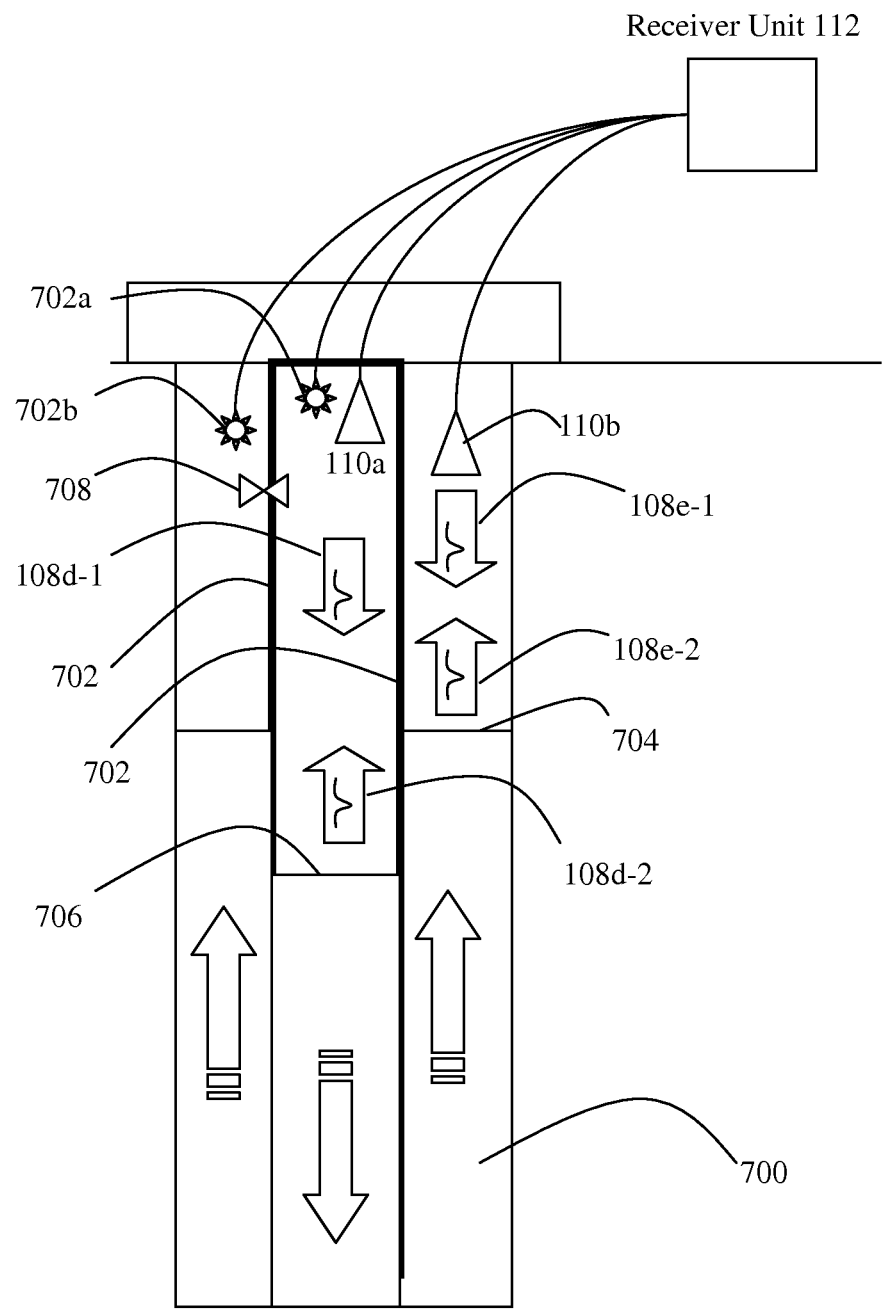
FIG. 7 is a schematic illustrating use of acoustic disturbances to monitor movement of entrained cement both inside and outside an annulus of the borehole system.

FIG. 7 illustrates monitoring progress of an entrained material (700) such as cement. The entrained material is introduced into the borehole inside an annulus (702) such as a metal casing. At some location, such as the bottom of the borehole, the entrained material moves to the outside of the annulus, and changes direction, i.e., moves back toward the surface. When positioning cement outside the annulus during well completion, it is useful to know the location of both the leading and trailing edges (704, 706) of the entrained cement. It should be noted that the distance between the leading and trailing edges is variable because the cross-sectional area outside the annulus can vary significantly because of fractures. In order to monitor the progress of both edges, acoustic disturbances (108d-1, 108e-1) are introduced both inside and outside the annulus. The edges (704, 706) will reflect at least a portion of the acoustic disturbances such that location can be determined from round trip time and modeling of reflected acoustic disturbances (108d-2, 108e-2) as already described above. The disturbances may be generated by operating a valve (708) connecting the fluid inside the annulus with the fluid outside the annulus, or alternatively by separate acoustic sources (702a, 702b). With the valve in a closed position it will be expected that there should be a pressure differential across the annulus. Hence, by opening the valve it is possible to generate acoustic disturbances on either side of the annulus which will be equal in amplitude and opposite in polarity. The reflected acoustic disturbances are detected by separate sensors (110a, 110b)

Figure 8:
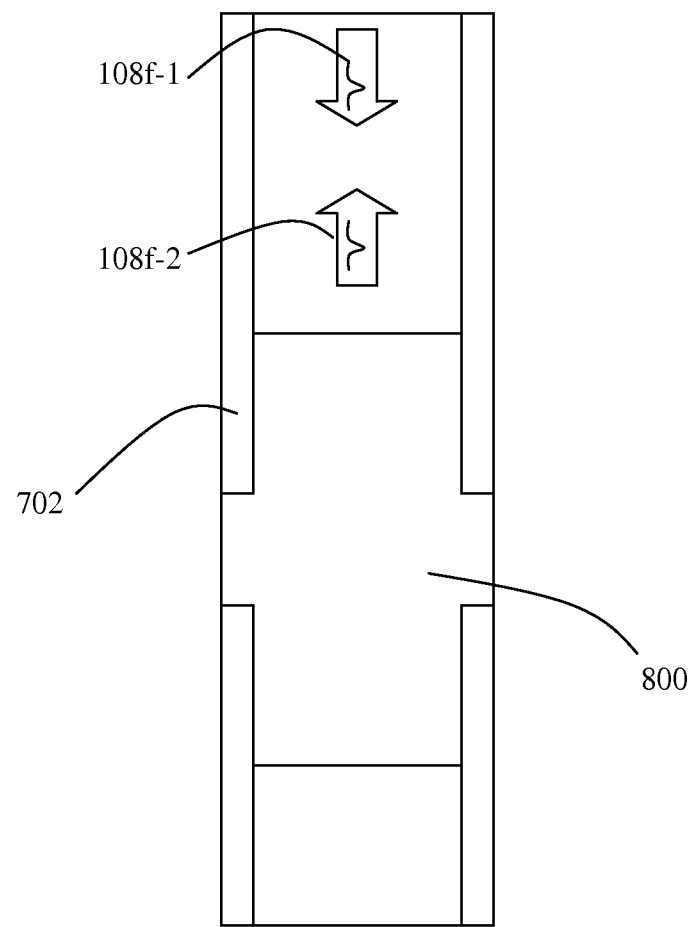
FIGS. 8 and 9 are a schematic and a graph illustrating use of reflected acoustic disturbances to monitor setting of cement in the borehole system.
Figure 9:
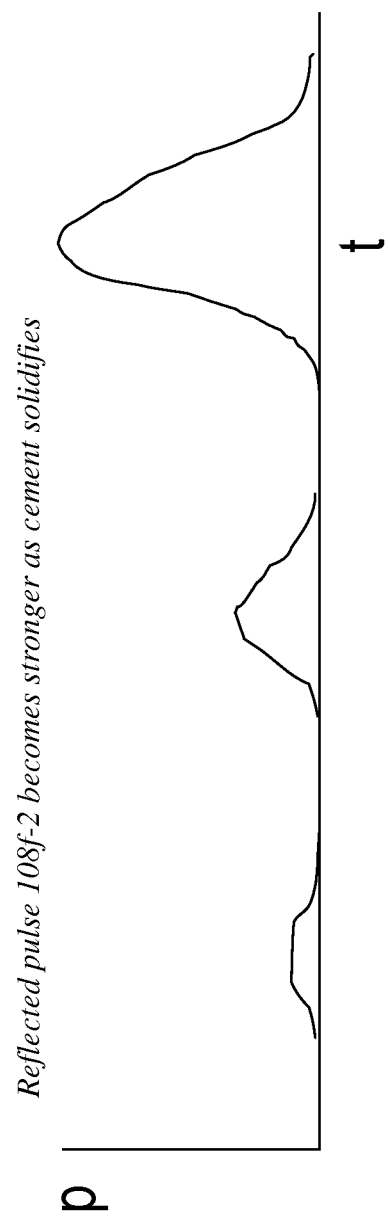

FIGS. 8 and 9 illustrate an embodiment for monitoring an object (800) based on changing reflection. An acoustic disturbance (108f-1) is initiated at a remote location. The remote location is depicted as being proximate to the borehole head, but any location apart from the downhole object would be considered a remote location. The acoustic disturbance (108f-1) propagates through the borehole and is reflected by the downhole object (800). The reflected disturbance (108f-2) is then detected by the sensor associated with the receiver unit at a known time as measured by the clock circuit. The state of the object (800) may be calculated from the strength of the reflection, e.g., the reflection coefficient, as interpreted by a model of effects of the borehole system on the acoustic disturbance. Alternatively, multiple reflected disturbances can be detected over time in order to obtain information from the magnitude and rate of change in reflection coefficient over time. Some specific applications of this embodiment include, but are not limited to, monitoring cement slugs as they set, monitoring packers as they inflate or swell, monitoring gravel pack placement, and CT cleanout. In the case of a setting cement slug, for example, it would be expected that the amplitude of reflected disturbances (108f-2) would increase in proportion to the level of cure of the cement as illustrated in FIG. 9.

Figure 10:
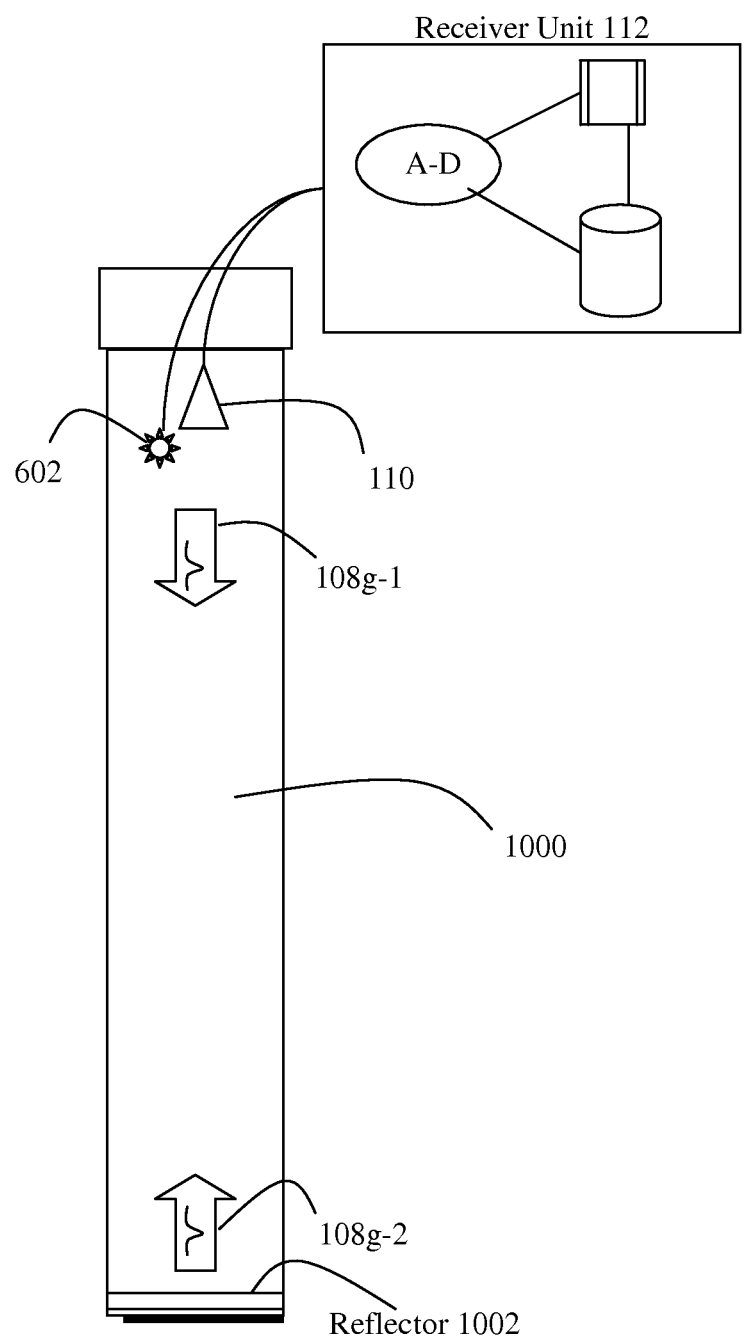
FIGS. 10 and 11 are a schematic and a graph illustrating use of a reflected acoustic disturbances to monitor conditions in the borehole fluid.
Figure 11:
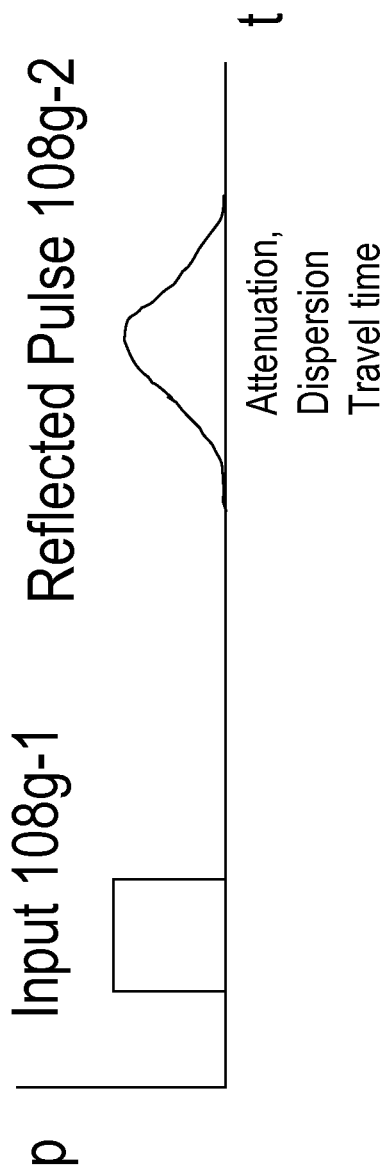

FIGS. 10 and 11 illustrate an embodiment for monitoring conditions in the fluid (1000) traversed in the borehole system. As in the previous embodiment, an acoustic disturbance (108g-1) is introduced at a remote location by an acoustic source (602), and the reflected disturbance (108g-2) is detected by the sensor (110). However, it is not the changing reflection coefficient of the reflector (1002) that is monitored, but rather the effect of the intervening fluid (1000) on the disturbances. Therefore, it is preferable that the reflector (1002) remain relatively constant during the time period in which measurements are taken. The borehole fluid can effect the disturbance in terms of attenuation, dispersion and travel time. A model is employed for predicting response dependent upon parameters detailing at least one of wellbore system geometry, viscoacoustic properties of the fluid and entrained solids contained in the wellbore system, locations of boundaries and entrained solids, and characteristics and locations of disturbances to pressure and flow in the wellbore system, in order to determine a best prediction of some attribute of the detected disturbances. Potential applications for this embodiment include, but are not limited too, monitoring cement setting by pulsing fluid inside casing, simultaneously monitoring both sides of an annulus, monitoring fluid properties including viscosity, density, and temperature, detection of solids suspended in fluid, including CT cleanout, detection of scale, unsuspended solids, filter cakes, and the like, and CT cleanout.

While the invention is described through the above exemplary embodiments, it will be understood by those of ordinary skill in the art that modification to and variation of the illustrated embodiments may be made without departing from the inventive concepts herein disclosed. Moreover, while the preferred embodiments are described in connection with various illustrative structures, one skilled in the art will recognize that the system may be embodied using a variety of specific structures. Accordingly, the invention should not be viewed as limited except by the scope and spirit of the appended claims.

What is claimed is:

1. A method for detecting the occurrence of a predetermined condition in a fluid-filled wellbore system, the method comprising:
   generating at least one pressure pulse triggered in response to the occurrence of the predetermined condition; and
   detecting the at least one generated pulse, wherein the detection is indicative that the predetermined condition has occurred.

2. The method of claim 1 wherein the predetermined condition includes at least one of: (i) a specific level of pressure, (ii) a specific level of pH, (iii) a specific level of temperature, (iv) a specific level of background radiation, (v) a specific level of velocity, (vi) state of cure of entrained cement, epoxy, or other substance which gels and sets over time after placement downhole, and (vii) any combinations thereof.

3. The method of claim 1, wherein said at least one pressure pulse is a low frequency variation of at most 2 kHz in pressure at a known location.

4. The method of claim 1, wherein the at least one pressure pulse is generated at a known location.

5. The method of claim 4, wherein the known location is a location of a casing float collar.

6. Apparatus operable to detect a predetermined condition in a fluid-filled wellbore system, the apparatus comprising:
   a pulse generator operable to generate at least one pressure pulse in response to a predetermined triggering condition of the fluid-filled wellbore system; and
   at least one sensor operable to detect the at least one generated pulse, wherein the detection is indicative that the predetermined condition has occurred.

7. The apparatus of claim 6, wherein the predetermined triggering condition includes at least one of: (i) a specific level of pressure, (ii) a specific level of pH, (iii) a specific level of temperature, (iv) a specific level of background radiation, (v) a specific level of velocity, (vi) state of cure of entrained cement, epoxy, or other substance which gells and sets over time after placement downhole, and (vii) any combinations thereof.

8. The apparatus of claim 6, wherein the pulse generator is disposed at a known location.

9. The method of claim 6, wherein the pulse generator creates a low frequency variation of at most 2 kHz in pressure at the known location.

10. The apparatus of claim 6, wherein the pulse generator has a sensor associated therewith that measures or detects the occurrence of the predetermined condition.

11. A method for detecting the occurrence of a predetermined condition in a fluid-filled wellbore system traversing a formation, the method comprising:
   placing a pulse generator in the fluid-filled wellbore system;
   using the pulse generator, generating, without communication from any control device from a surface of the formation, at least one pressure pulse triggered in response to the occurrence of the predetermined condition; and
   detecting the at least one generated pulse uphole from the pulse generator, wherein the detection is indicative that the predetermined condition has occurred.

12. The method of claim 11, wherein the predetermined condition includes at least one of: (i) a specific level of pressure, (ii) a specific level of pH, (iii) a specific level of temperature, (iv) a specific level of background radiation, (v) a specific level of velocity, (vi) state of cure of entrained cement, epoxy, or other substance which gels and sets over time after placement downhole, and (vii) any combinations thereof.

13. The method of claim 11, wherein the pulse generator has a sensor associated therewith that measures or detects the occurrence of the predetermined condition.

* * * * *